US006876179B2

(12) United States Patent
Chou et al.

(10) Patent No.: US 6,876,179 B2

(45) Date of Patent: Apr. 5, 2005

(54) HYBRID REACTIVE POWER COMPENSATION DEVICE

(75) Inventors: Hurng-Liang Chou, Kaohsiung (TW); Chin-Chang Wu, Kaohsiung (TW); Wen-Pin Hsu, Kaohsiung (TW); Yao-Jen Chang, Kaohsiung (TW)

(73) Assignee: UIS Abler Electronics Co., Ltd., Taipei Hsien (TW)

( * ) Notice: Subject to any disclaimer, the term of this patent is extended or adjusted under 35 U.S.C. 154(b) by 42 days.

(21) Appl. No.: 10/424,707

(22) Filed: Apr. 29, 2003

(65) Prior Publication Data

US 2004/0090214 A1 May 13, 2004

(30) Foreign Application Priority Data

Nov. 8, 2002 (TW) ....................................... 91133220 A

(51) Int. Cl.$^7$ ............................. G05F 1/70; H02M 1/12

(52) U.S. Cl. .......................... 323/207; 363/40; 307/105

(58) Field of Search ................................ 323/207, 208, 323/209, 210, 211, 218; 363/34, 37, 41, 44, 39, 40; 307/102, 105

(56) References Cited

U.S. PATENT DOCUMENTS 3,942,100 A * 3/1976 Kauferle et al. ............ 323/210

5,757,099 A * 5/1998 Cheng et al. ............... 307/105

* cited by examiner

*Primary Examiner*—Rajnikant B. Patel

(74) *Attorney, Agent, or Firm*—Bacon & Thomas, PLLC

(57) ABSTRACT

A hybrid reactive power compensation device comprises a passive type reactive power compensator and an active type reactive power compensator serially connected thereto. The passive type reactive power compensator is an AC power capacitor adapted to provide the reactive power that reduces capacity of the active type reactive power compensator. The active type reactive power compensator is consisted of a power converter, a DC capacitor, a high-frequency ripple filter and a controller. The hybrid reactive power compensation device can supply a linearly adjustable reactive power within a predetermined range, and the supplied current is approximated to be a sinusoidal waveform. Therefore, it can avoid the destruction of AC power capacitor caused by the power resonance.

8 Claims, 4 Drawing Sheets

HYBRID REACTIVE POWER COMPENSATION DEVICE

BACKGROUND OF THE INVENTION

1. Field of the Invention

The present invention is related to a hybrid reactive power compensation device including a passive type reactive power compensator and an active type reactive power compensator serially connected thereto, which are adapted to supply a linearly adjustable reactive power within a predetermined range in the distribution power system. The present invention is related to a hybrid reactive power compensation device including an active type reactive power compensator adapted to adjust a current flowing through the passive type reactive power compensator to be approximated as a sinusoidal waveform, and thereby it can avoid the power resonance generated between itself and the reactance of power system that may destroy the reactive power compensation device and adjacent power facilities.

2. Description of the Related Art

Most of loads in distribution power system have the characteristic of inductance, and it will result in the poor power factor. Hence, it requires a larger current for the identical real power that reduces the power efficiency of distribution power system and degrades the performance of voltage regulation of the load side. For solving the above problems, power substations and power consumers generally install a passive type reactive power compensator (AC power capacitors) parallel connected to the distribution power system, so as to compensate a lagging reactive power to increase the entire power factor. In some distribution power system, the capacity of applied AC power capacitor is about 25% to 35% of total capacity, and in some other distribution power system even exceeds about 50%, according to research reports.

Recently, harmonic pollution of industrial power system is increased seriously due to the wide use of nonlinear loads. The AC power capacitor for power factor correction provides with a low impedance path for harmonic current, hence, the AC power capacitor is frequently damaged by harmonics. Meanwhile, it results in the power resonance between the AC power capacitor and the distribution power system. Then, it will result in the amplification of harmonic current and harmonic voltage. Thus, the destruction of the AC power capacitor due to over-voltage or over-current may occur. Besides, the over-voltage of AC power capacitor caused by the power resonance may destroy neighboring electric power facilities and even result in public accidents.

In order to solve the power resonance problem caused by the AC power capacitor, the voltage rating is increased to avoid the destruction of over-voltage in conventional solution. However, it cannot resolve the resonance problem and may, therefore, cause the destruction of neighboring power facilities.

There is another solution that the AC power capacitor is switched off from the power system when over-voltage or over-current occurs, but the function of reactive power compensation will be failed.

The reactive power compensation also can be obtained by using a set of constant AC power capacitors merely providing a fixed reactive power. This fixed reactive power cannot be adjusted to respond to the variation of loads, and it may result in over-voltage due to the light load. In order to properly adjust reactive power provided by the AC power capacitor, an automatic power factor regulator (APFR) is developed, as shown in FIG. 1. The APFR is consisted of a set of AC power capacitors $C_1$ through $C_N$ via switches $S_1$ through $S_N$. Thereby the reactive power supplied from the APFR can be adjusted by changing number of AC power capacitors switching on. Although APFR can supply an adjustable reactive power to respond to the variation of loads, the APFR can merely be adjusted step by step not linearly. Therefore, the power factor of the distribution power system compensated by APFR still cannot be close unity.

Referring to FIG. 2, another power factor regulator uses a fixed capacitor parallel connected to a controllable reactor 11, which is controlled by a thyristor switch 10. This power factor regulator, so-called a Fixed-Capacitor Thyristor-Controlled Reactor (FC-TCR), uses phase control technique to control the thyristor switch 10, thereby it can provide with a linearly adjustable reactive power. However, it generates a significant amount of harmonic current and results in serious harmonic pollution due to the use of phase control technique in thyristor.

The reactive power is adjustable in the two reactive power compensation devices described in preceding paragraphs, but the AC power capacitor thereof is parallel connected to a power system and it still cannot avoid the problem of destruction caused by the power resonance.

Referring to FIG. 3, it illustrates a facility based on power electronic technology to be applied in a distribution power system to compensate reactive power, so-called the active type reactive power compensator 2. This active type reactive power compensator uses a power converter 20 via an inductor 21 to be connected to a power system 1. The power converter 20 is connected to a DC power capacitor 22 at its DC side. The active type reactive power compensator 2 may provide with a leading reactive power or a lagging reactive power. The supplied reactive power can be adjusted linearly to respond to the variation of loads that the input power factor can be maintained to be close to unity. Meanwhile, the active power factor correction system will not result in power resonance. Hence, it can avoid the destruction of the power resonance generated by an AC power capacitor. However, the active type reactive power compensator 2 must compensate the reactive power required by the loads, it requires a large capacity of power converter in the active type reactive power compensator. Hence, the wide application is limited due to the high cost.

The present invention intends to provide a hybrid reactive power compensation device used for supplying the linearly adjustable reactive power within a predetermined range. Meanwhile, the hybrid reactive power compensation device includes an active type reactive power compensator to adjust the compensation current to be approximated as a sinusoidal waveform, and thereby it can avoid the power resonance generated between itself and the reactance of power system. Therefore, it can avoid the destruction of itself and the neighboring power facilities by the power resonance. Moreover, the manufacture cost of the present invention is less expensive than that of the conventional active type reactive power compensator.

SUMMARY OF THE INVENTION

The primary objective of this invention is to provide a hybrid reactive power compensation device including a passive type reactive power compensator and an active type reactive power compensator serially connected thereto, which adapted to supply a linearly adjustable reactive power and thereby avoid the destruction of power resonance. The manufacture cost of this invention is less expensive than that of the conventional active type reactive power compensator.

The hybrid reactive power compensation device in accordance with the present invention mainly comprises a passive type reactive power compensator and an active type reactive power compensator serially connected thereto. The passive type reactive power compensator is an AC power capacitor adapted to provide with reactive power that, thus, reduces reactive power supplied from the active type reactive power compensator. Additionally, it can reduce the voltage rating and the capacity of active type reactive power compensator. Since the cost of AC power capacitor is less expensive significantly than that of the active type reactive power compensator, the manufacture cost of the present invention is also less expensive than that of the conventional active type reactive power compensator. The active type reactive power compensator is consisted of a power converter, a DC capacitor, a high-frequency ripple filter and a controller. The hybrid reactive power compensation device is adapted to supply linearly adjustable reactive power within a predetermined range. The hybrid reactive power compensation device can supply a current with a nearly sinusoidal waveform for reactive power compensation due to the use of active type reactive power compensator, and thereby it can avoid the power resonance generated by itself and reactance of the power system. Therefore, it can avoid the destruction of itself and neighboring power facilities due to the power resonance.

Other objectives, advantages and novel features of the invention will become more apparent from the following detailed description and the accompanying drawings.

BRIEF DESCRIPTION OF THE DRAWINGS

The present invention will now be described in detail with reference to the accompanying drawings herein.

DETAILED DESCRIPTION OF THE INVENTION

Figure 1:
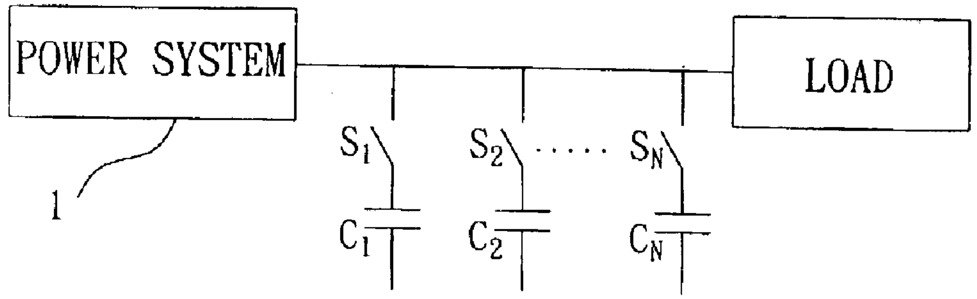
FIG. 1 PRIOR ART
FIG. 1 is a schematic view of a conventional automatic power factor regulator in accordance with the prior art.
Figure 2:
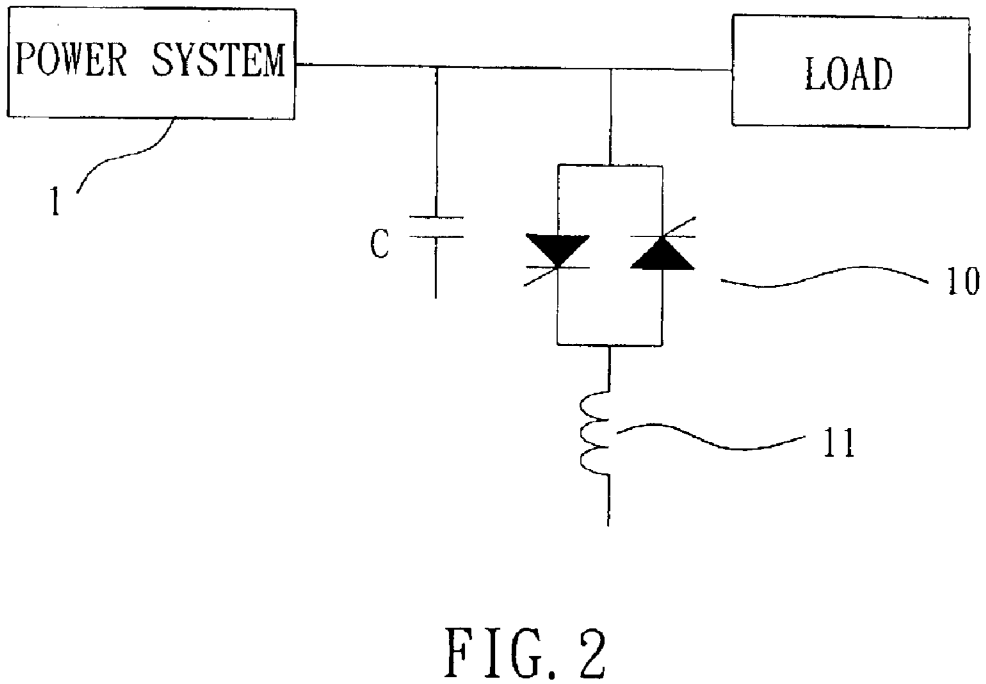
FIG. 2 PRIOR ART
FIG. 2 is a structural schematic view of a conventional fixed-capacitor thyristor-controlled reactor in accordance with the prior art.
Figure 3:
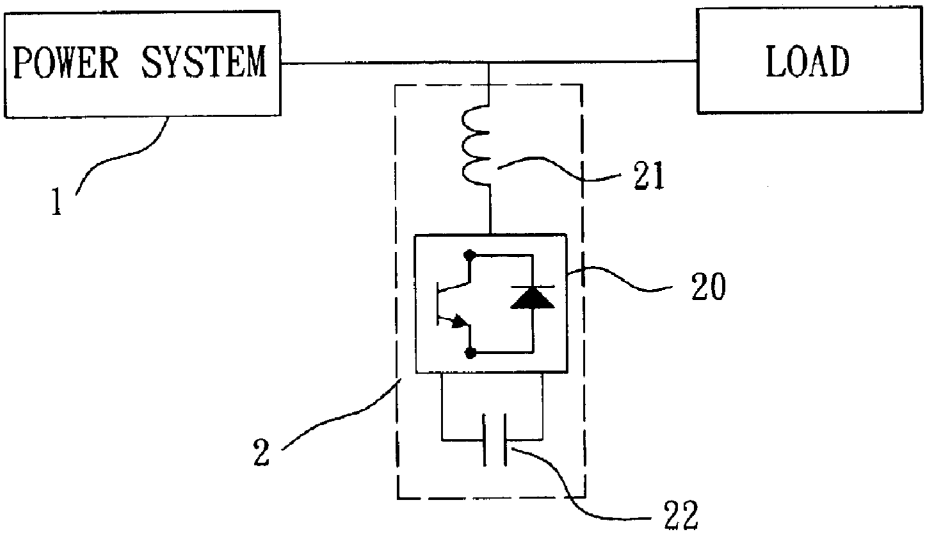
FIG. 3 PRIOR ART
FIG. 3 is a structural schematic view of a conventional active type reactive power compensator in accordance with the prior art.
Figure 4:
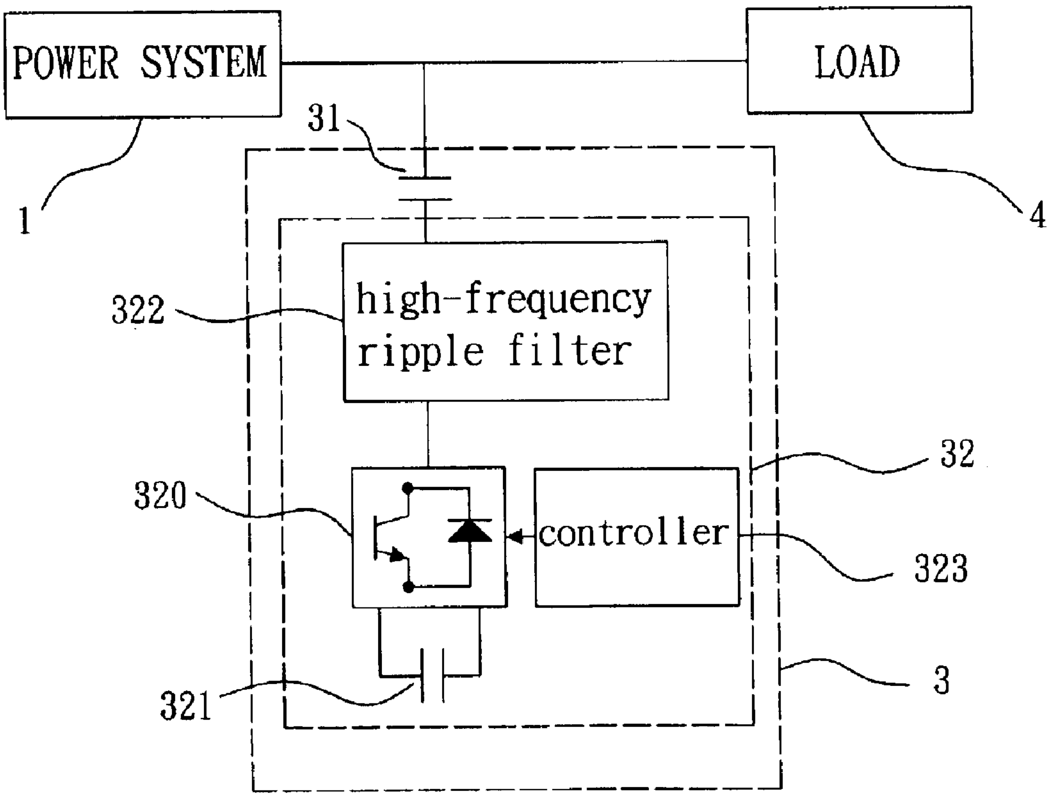
FIG. 4 is a structural schematic view of a hybrid reactive power compensation device in accordance with a first embodiment of the present invention.

FIG. 4 illustrates a system structure of a hybrid reactive power compensation device in accordance with the first embodiment of the present invention. Referring to FIG. 4, the hybrid reactive power compensation device 3 is parallel connected between a power system 1 and a load 4. The power system 1 provides an AC power to the load 4. The hybrid reactive power compensation device 3 is adapted to compensate the reactive power required by the load 4 to thereby improve the power factor from the view of power system 1. The hybrid reactive power compensation device 3 includes a passive type reactive power compensator 31 and an active type reactive power compensator 32 serially connected thereto. The passive type reactive power compensator 31 is a power capacitor adapted to supply the reactive power, thereby reducing the reactive power supplied from the active type reactive power compensator 32. The active type reactive power compensator 32 includes a power converter 320, a DC power capacitor 321, a high-frequency ripple filter 322 and a controller 323. The active type reactive power compensator 32 is used to linearly adjust the reactive power supplied from the hybrid reactive power compensation device 3 within a predetermined range. In addition, the active type reactive power compensator 32 can avoid the destruction of power resonance generated between the passive type reactive power compensator 31 and the impedance of power system 1.

Figure 5:
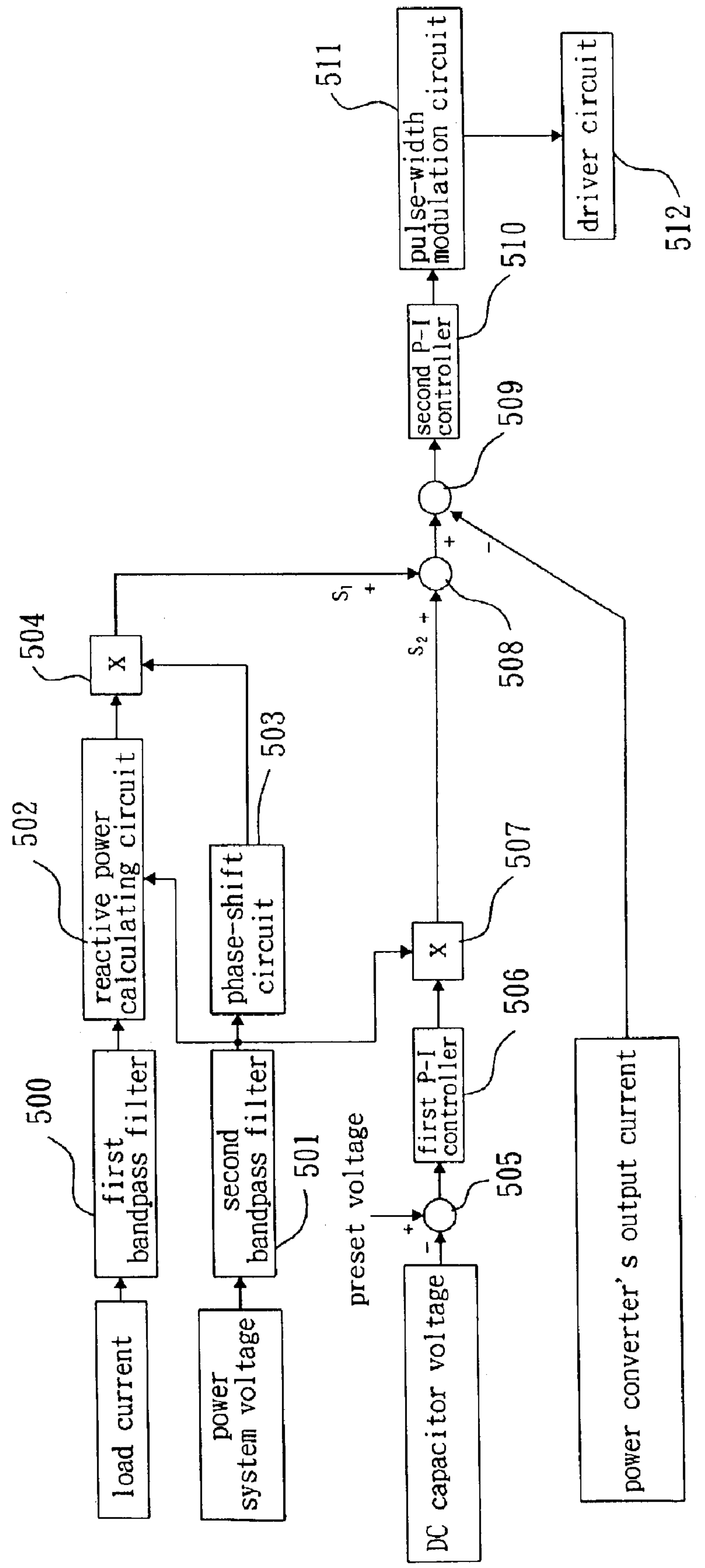
FIG. 5 is a control block diagram of active type reactive power compensator in accordance with the first embodiment of the present invention.

FIG. 5 illustrates a block diagram of the controller 323 of the active type reactive power compensator 32 in accordance with the first embodiment of the present invention. Referring again to FIG. 5, the active type reactive power compensator 32 adopts the current mode control, which applies a power converter 320 for controlling a sinusoidal current with 90 degrees leading with the voltage of power system. The output current of power converter is passing through the hybrid reactive power compensation device 3. Subsequently, the reactive power supplied from the hybrid reactive power compensation device 3 can be adjusted by controlling the amplitude of the fundamental component of power converter's output current. Consequently, the hybrid reactive power compensation device 3 can avoid the destruction of power resonance because the current passing through is a sinusoidal waveform with the fundamental frequency.

Referring to FIGS. 4 and 5, the controller 323 provides with a current reference signal, which is consisted of two control signals $S_1$ and $S_2$. The first control signal $S_1$ is used for adjusting the reactive power. The first control signal $S_1$ must be leading the voltage signal of fundamental component of the power system 1 by 90 degrees since the active type reactive power compensator 32 applies the current mode control. The load current is sent to the first band-pass filter 500 to obtain its fundamental component, and the voltage of power system is sent to the second band-pass filter 501 to obtain its fundamental component. Then, both outputs of the first band-pass filter 500 and the second band-pass filter 501 are fed to the reactive power calculating circuit 502. The reactive power calculating circuit 502 calculates and supplies the desired amplitude of reactive power current demanded by the hybrid reactive power compensation device 3.

In order to obtain the wave-shape of the reactive power current, the fundamental component supplied from the second band-pass filter 501 is sent to a phase-shift circuit 503 that may produce the signal which phase is 90 degrees leading with the fundamental component of power system voltage. After that the outputs of the phase-shift circuit 503 and the reactive power calculating circuit 502 are sent to a multiplier 504 for obtaining the first control signal $S_1$. The second control signal $S_2$ is used to regulate the voltage of DC power capacitor 321 of the active type reactive power compensator 32. The active type reactive power compensator 32 has power loss and thus the voltage of DC power capacitor 321 may be varied. In order to maintain the active type reactive power compensator 32 operated normally, the DC voltage thereof must be maintained at a constant value. In this condition, the active type reactive power compensator 32 must absorb/generate real power from/to the power system 1. It means that the active type reactive power compensator 32 must generate a fundamental component current which phase is in phase with the phase of the power system 1 voltage. For obtaining this purpose, the DC voltage 321 of the active type reactive power compensator 32 is detected. The detected DC voltage 321 and a preset voltage must be sent to a subtractor 505, and then the subtracted result is sent to the first P-I controller 506. The output of the first controller 506 and the output fundamental signal of the second band-pass filter 501 are sent to a multiplier 507 to get second control signal $S_2$.

Referring to FIGS. 4 and 5, the reference signals can be obtained when the two control signals $S_1$ and $S_2$ are added in an adder 508. Then the reference signals and the output current of the active type reactive power compensator 32 are sent to a subtractor 509. The output of the subtractor 509 is passed to the second P-I controller 510 to obtain a modulation signal, and then the modulation signal is sent to a pulse-width modulation circuit 511 to generate the pulse-width modulation signal. Consequently, the pulse-width modulation signal is sent to a driver circuit 512. Then, the driving signals of the power converter 320 of the active type reactive power compensator 32 can be obtained.

Figure 6:
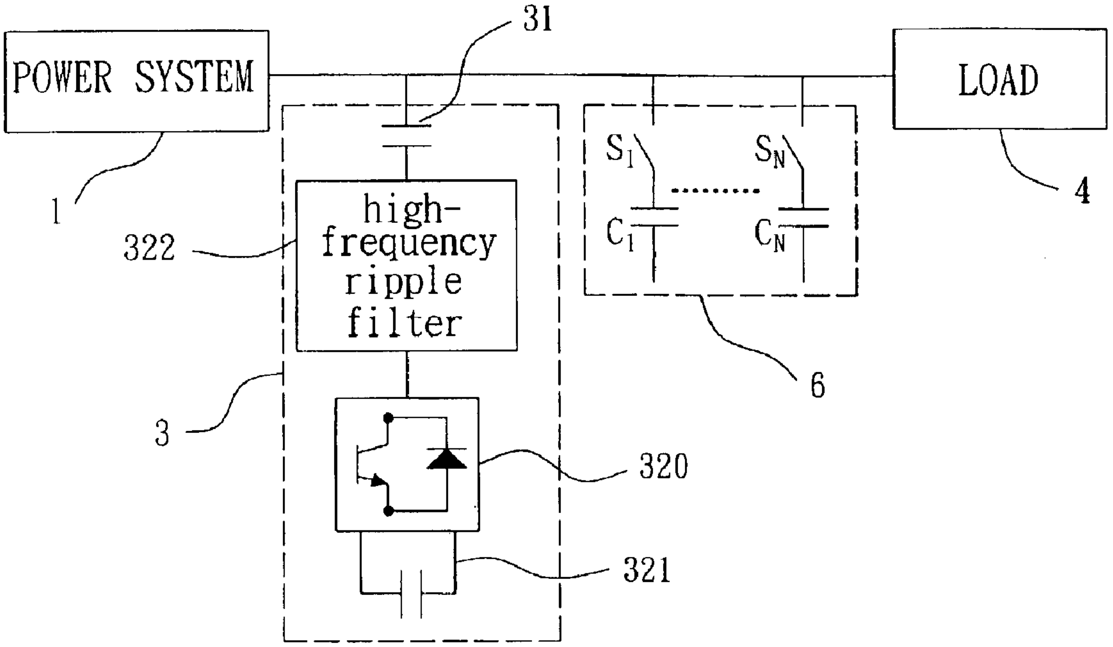
FIG. 6 is a structural schematic view of a parallel connection of a hybrid reactive power compensation device with an automatic power factor regulator system in accordance with a second embodiment of the present invention.

Referring to FIG. 6, it is illustrated that the second embodiment includes the hybrid reactive power compensation device 3 of the first embodiment and an automatic power factor regulator system (APFR system) 6 connected parallel thereto. The connected hybrid reactive power compensation device 3 and APFR system 6 is parallel connected between the power system 1 and the load 4. The power system 1 supplies the AC power to the load 4. The combination of the hybrid reactive power compensation device 3 and the APFR system 6 is used to supply the reactive power for compensating the reactive power demanded by the load 4. The APFR system 6 adjusts the reactive power step by step for rough tuning, and the hybrid reactive power compensation device 3 adjusts the reactive power linearly for fine tuning so that improves the input power factor to be closed to unity. Thus the capacity of the hybrid reactive power compensation device 3 is reduced. Consequently, the second embodiment merely requires a relatively small capacity of the hybrid reactive power compensation device 3 to incorporate into the APFR system 6 and it can linearly adjust the reactive power for improving the power factor.

Figure 7:
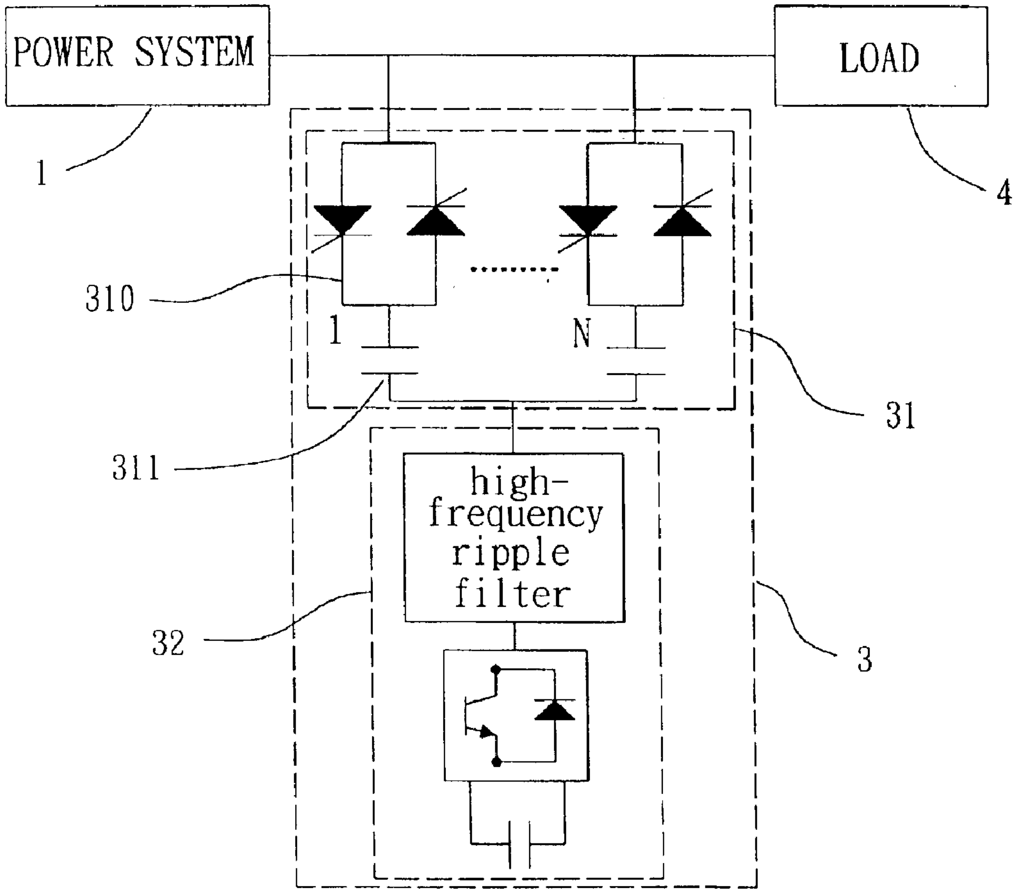
FIG. 7 is a structural schematic view of a hybrid reactive power compensation device in accordance with a third embodiment of the present invention.

Referring to FIG. 7, it is illustrated that the hybrid reactive power compensation device 3 of the third embodiment is parallel connected between the power system 1 and the load 4. The power system 1 supplies an AC power to the load 4. The hybrid reactive power compensation device 3 is used to supply the reactive power demanded by the load 4. The hybrid reactive power compensation device 3 improves the input power factor to be closed to unity. The hybrid reactive power compensation device 3 includes a passive type reactive power compensator 31 and an active type reactive power compensator 32 serially connected thereto. The passive type reactive power compensator 31 may be a thyristor switch assembly 310 and an AC power capacitor assembly 311 serially connected thereto to form a Thyristor Switch Capacitor (TSC). In practical application, the hybrid reactive power compensation device 3 can be operated with different step numbers of the AC power capacitor 311 therein by means of switching the thyristor switch assembly 310 that accomplishes rough tuning for adjusting reactive power. Moreover, it can adjust the reactive power for fine-tuning by means of the active type reactive power compensator 32 that improves the input power factor to be closed to unity. The active type reactive power compensator 32 applies a control method of the first embodiment that generates the current with fundamental waveform. Consequently, the AC power capacitor assembly 311 formed in the passive type reactive power compensator 31 can avoid the destruction caused by the power resonance.

Although the invention has been described in detail with reference to its presently preferred embodiment, it will be understood by one of ordinary skill in the art that various modifications can be made without departing from the spirit and the scope of the invention, as set forth in the appended claims.

What is claimed is:

1. A hybrid reactive power compensation device parallel-connected to a power system to provide reactive power to thereby improve the power factor, comprising:

a passive type reactive power compensator adapted to provide the reactive power; and an active type reactive power compensator serially connected to the passive type reactive power compensator, said active type reactive power compensator adapted to regulate the supplied reactive power within a predetermined range according to a load, and to force the supplied current passing through the hybrid reactive power compensation device to be sinusoidal;

wherein the passive type reactive power compensator reduces power capacity of the active type reactive power compensator; the active type reactive power compensator thereby avoiding destruction of the passive type reactive power compensator caused by power resonance.

2. The hybrid reactive power compensation device as defined in claim 1, wherein the passive type reactive power compensator is an AC power capacitor or a thyristor switching capacitor.

3. The hybrid reactive power compensation device as defined in claim 2, wherein the passive type reactive power compensator is a thyristor switching capacitor, which is used to supply the adjustable reactive power for rough tuning.

4. The hybrid reactive power compensation device as defined in claim 1, wherein the active type reactive power compensator includes a power converter, a DC power capacitor, a high-frequency ripple filter and a controller.

5. The hybrid reactive power compensation device as defined in claim 1, wherein the active type reactive power compensator includes a current mode control.

6. The hybrid reactive power compensation device as defined in claim 5, wherein the current mode control of the active type reactive power compensator provides a first control signal and a second control signal including reference signals, the reference signals and the output current of the active type reactive power compensator being controlled by a control circuit so that the output current of the active type reactive power compensator is consistent with the reference signal.

7. The hybrid reactive power compensation device as defined in claim 6, wherein the first control signal is adapted to accomplish a function of adjusting the reactive power, the first control signal is a sinusoidal signal leading the voltage signal of a fundamental component of the power system by 90 degrees since the active type reactive power compensator is controlled by the current mode control, which adjusts the amplitude of the first control signal to thereby provide a linearly adjustable reactive power; and the second control signal is adapted to regulate the voltage of a DC capacitor of the active type reactive power compensator, the active type reactive power compensator being arranged to generate a fundamental sinusoidal signal in phase with the voltage of the power system so that the active type reactive power compensator can absorb real power from the power system or generate and supply real power to the power system, thereby regulating the voltage of the DC capacitor of the active type reactive power compensator.

8. The hybrid reactive power compensation device as defined in claim 1, wherein the hybrid reactive power compensation device is parallel-connected to an automatic power factor regulator system, the automatic power factor regulator system is able to adjust the reactive power for rough tuning, and the hybrid reactive power compensation device supplies a sinusoidal current to linearly adjust the reactive power for fine tuning to improve the input power factor to be close to unity, thereby reducing the capacity of the hybrid reactive power compensation device.

* * * * *